US012731897B2

(12) United States Patent
Segador Alvarez et al.

(10) Patent No.: US 12,731,897 B2
(45) Date of Patent: Sep. 8, 2026

(54) COMPACT DUAL POLARITY RADIATOR FOR A DENSE ARRAY

(71) Applicant: HUAWEI TECHNOLOGIES CO., LTD., Shenzhen (CN)

(72) Inventors: Juan Segador Alvarez, Munich (DE); Zhi Gong, Dongguan (CN); Dmitrij Semilovsky, Munich (DE); Bruno Biscontini, Munich (DE); Alejandro Murillo Barrera, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 29 days.

(21) Appl. No.: 18/926,136

(22) Filed: Oct. 24, 2024

(65) Prior Publication Data

US 2025/0055189 A1 Feb. 13, 2025

Related U.S. Application Data

(63) Continuation of application No. PCT/EP2022/061052, filed on Apr. 26, 2022.

(51) Int. Cl.
*H01Q 9/28* (2006.01)
*H01Q 1/48* (2006.01)
(Continued)

(52) U.S. Cl.
CPC ............... *H01Q 5/378* (2015.01); *H01Q 1/48* (2013.01); *H01Q 9/16* (2013.01); *H01Q 13/106* (2013.01); *H01Q 19/10* (2013.01)

(58) Field of Classification Search
CPC ............ H01Q 1/24; H01Q 1/246; H01Q 1/48; H01Q 13/10; H01Q 13/106; H01Q 19/10;
(Continued)

(56) References Cited

U.S. PATENT DOCUMENTS 9,722,323 B2 * 8/2017 Yona ...................... H01Q 1/521
10,270,185 B2 * 4/2019 Boutayeb ............... H01Q 9/285
(Continued)

FOREIGN PATENT DOCUMENTS

CN 204011714 U 12/2014
WO 2017133849 A1 8/2017

OTHER PUBLICATIONS

Li et al., "High Port Isolation Co-Located Patch Antenna," 2013 Proceedings of the International Symposium on Antennas & Propagation, total 3 pages, Institute of Electrical and Electronics Engineers, New York, New York (Oct. 23, 2013).

*Primary Examiner* — Tho G Phan
(74) *Attorney, Agent, or Firm* — Leydig, Voit & Mayer, Ltd.

(57) ABSTRACT

A dual polarity antenna including: a first radiator for radiating or for receiving a first radio-frequency (RF) wave having a first linear polarisation, and a second radiator for radiating or for receiving a second RF wave having a second linear polarisation orthogonal to the first linear polarisation. The first radiator includes one or more electrically conductive parts and the second radiator is provided by one or more slots in the one or more electrically conductive parts. An antenna column array may be densified and the size of the array columns may be reduced by locating and/or embedding the second radiator in the first radiator.

18 Claims, 7 Drawing Sheets

(51) Int. Cl.

| | |
|---|---|
| ***H01Q 5/378*** | (2015.01) |
| ***H01Q 9/16*** | (2006.01) |
| ***H01Q 13/10*** | (2006.01) |
| ***H01Q 19/10*** | (2006.01) |
| ***H01Q 21/24*** | (2006.01) |

(58) Field of Classification Search

CPC ...... H01Q 19/108; H01Q 21/08; H01Q 21/24; H01Q 25/00; H01Q 25/001; H01Q 5/37; H01Q 5/378; H01Q 9/16; H01Q 9/28

See application file for complete search history.

(56) References Cited

U.S. PATENT DOCUMENTS

| | | | | |
|---|---|---|---|---|
| 11,145,994 | B2 * | 10/2021 | Sundararajan ......... | H01Q 21/24 |
| 11,205,859 | B2 * | 12/2021 | Segador Alvarez ... | H01Q 5/307 |
| 11,431,110 | B2 * | 8/2022 | Aviv ...................... | H01Q 5/378 |
| 12,062,855 | B2 * | 8/2024 | Li ........................ | H01Q 21/062 |
| 2018/0337462 | A1 | 11/2018 | Vollmer et al. | |
| 2020/0373671 | A1 | 11/2020 | Li et al. | |

* cited by examiner

COMPACT DUAL POLARITY RADIATOR FOR A DENSE ARRAY

CROSS-REFERENCE TO RELATED APPLICATIONS

This application is a continuation Application No. PCT/EP2022/061052, filed on Apr. 26, 2022, the disclosure of which is hereby incorporated by reference in its entirety.

FIELD

This invention relates to dual polarity antennas, for example for use in sub-1 Gigahertz (GHz) frequency bands.

BACKGROUND

The evolution towards Massive Multiple Input Multiple Output (MIMO) antennas in sub-1 GHz frequency bands is becoming increasingly important. Benefits may be obtained both from the high throughputs delivered by Massive MIMO technology and the traditional good coverage of sub-1 GHz frequency bands.

The sub-1 GHz band may be considered the best available spectrum in mobile communications. However, the bandwidth assigned to each operator can be small (typically 10 Megahertz (MHz) per sub-band). Therefore, any solution to improve the spectral efficiency in the 700/800/900 MHz bands may be valuable.

One option to improve the spectral efficiency would be to densify the antenna aperture. There is a need to develop a radiating element that is dual polarity and has a very small footprint, at least in horizontal direction, to densify the antenna aperture and increase the number of array columns.

Typical dual-polarity radiators working in the 700 MHz band may have a footprint of at least 115×115 mm, which results in 0.26×0.26 in terms of wavelength at the lowest frequency, 690 MHz.

One way to achieve miniaturization and densify the antenna may be to use materials with high dielectric constant. The materials with high dielectric constant can be used to construct very small patch antennas or dielectric resonator antennas. There are examples of these radiators in the prior art. An example of this is illustrated in FIGS. 1A and 1B. FIG. 1A illustrates an example antenna of the prior art. A dielectric resonator 101 may be positioned on a ground plate 103. The ground plate 103 may include a microstripline 102 and a slot coupling 104.

FIG. 1B illustrates another example antenna of the prior art. In this example, the ground plate 103 may include a metal patch 105.

The main problem of the concepts illustrated in FIGS. 1A and 1B is the volume of dielectric material required, which has high weight and cost, especially in sub 1 GHz bands. The features depicted in FIGS. 1A and 1B may be implemented for higher frequencies, but it may be very difficult to implement such features for frequencies below 1 GHz.

FIG. 2 illustrates an example dual polarity antenna of the prior art. The dual-polarity radiator comprises a dipole 201, a reflector 203, and a cavity 202 backed slot 204. A dipole 201 is connected through a vertical member 205. The dipole 201 has vertical polarisation and the cavity 202 backed slot 204 has horizontal polarisation. This design may be compact and may be suitable for antenna array densification.

A problem with the prior art antenna illustrated in FIG. 2 is that it may require a substantial volume in the lower part of the antenna, below the reflector 203, to implement the cavity 202 that backs the slot 204 radiator. This may cause further problems, especially for active antennas where it may be required to plug the radio directly on the back. Having a flat reflector 203 in the back side may simplify the construction and assembly but, the implementation may still be quite complex as lot of parts are required.

It is desirable to develop an apparatus and method that overcomes the above problems.

SUMMARY

According to a first aspect there is provided a dual polarity antenna, including: a first radiator for radiating or for receiving a first radio-frequency (RF) wave having a first linear polarisation, and a second radiator for radiating or for receiving a second RF wave having a second linear polarisation orthogonal to the first linear polarisation, where the first radiator comprises one or more electrically conductive parts and the second radiator is provided by one or more slots in the one or more electrically conductive parts. The size of the dual-polarity radiator may be reduced, which may enable the antenna aperture to be densified, by locating and/or embedding the second radiator in the first radiator. This may increase the system throughput and improve the spectral efficiency.

In some implementations, the the first RF wave and the second RF wave have the same frequency. This provides the advantage that the antenna may not produce a multiband or multifrequency radiator.

In some implementations, each of the one or more slots has a closed end and an open end. This provides the advantage of providing a second radiating structure by having the slot with an open and closed end.

In some implementations, the first radiator is a dipole antenna, the dipole antenna including a first dipole arm and a second dipole arm. This may advantageously allow the vertical polarisation to be radiated by having the first radiator comprise two dipole arms.

In some implementations, the one or more slots include a first slot formed in the first dipole arm and a second slot formed in the second dipole arm. This may advantageously provide a second radiator in each of the dipole arms by providing a slot in each of the dipole arms.

In some implementations, the first slot and the second slot extend along a common axis of the first and the second dipole arm. This may advantageously provide a second radiation pattern which is symmetrical by providing the slots in a common axis.

In some implementations, the first slot has an open end at an outer end of the first dipole arm, and the second slot has an open end at an outer end of the second dipole arm. This may provide a second radiating structure by having the slot with an open and closed end.

In some implementations, the first slot has a closed end near an inner end of the first dipole arm, and the second slot has a closed end near an inner end of the second dipole arm. This may provide a section, or region, of the dipole arm which is located between the closed end of the slot and the first feeding point by having a closed end of the slots near an inner end of the dipole arms. This provides the advantage that there may not be interference between the first radiator and the second radiator.

In some implementations, the dual polarity antenna may further include: a first feeding network for exciting the first radiator with a first radio-frequency (RF) signal, and a second feeding network for exciting the second radiator with a second radio-frequency (RF) signal. This may provide the two orthogonal signals to the dual polarity antenna by providing the feeder networks.

In some implementations, the one or more slots are two or more slots, and the second feeding network is configured to excite the two or more slots in phase. This may enable the radiation of the two second radiators to combine constructively by providing the excitation in phase.

In some implementations, the second feeding network is configured to excite each respective slot of the one or more slots at a central region of the respective slot. This may give a reasonable level of impedance at the port by providing the excitation at a central region of the slot.

In some implementations, the first radiator includes two dipole arms and a first feeding point located between the two dipole arms, the first feeding network being coupled to the first radiator at the first feeding point. This may enable the vertical polarisation to be radiated through each of the dipole arms by locating the first feeding point between the dipole arms.

In some implementations, the dual polarity antenna may further include a reflector, the first radiator and the second radiator being arranged on one side of the reflector. This may enable the back of the reflector to be flat, which may simplify the integration with active equipment, by arranging the first radiator and the second radiator on one side of the reflector.

In some implementations, the one or more electrically conductive parts of the first radiator include one or more electrically conductive parts arranged in a substantially planar structure. This may provide a simplified manufacturing process.

In some implementations, the dual polarity antenna may further include a reflector that is substantially parallel to the substantially planar structure. The reflector may reflect the radiation from the first radiator and the second radiator in the required direction, i.e. upwards by providing the reflector and first radiator substantially parallel to one another.

In some implementations, the first radiator further includes one or more electrically conductive flaps extending in a direction substantially normal to the substantially planar structure. The flaps may increase the surface area of the dipole arms of the first radiator. This may increase the dipole electrical length of the dipole arms. This may cause the dipole arms to resonate at a lower frequency while keeping a small footprint. This provides the advantage that the level of radiation may be increased for a given footprint of the first radiator.

In some implementations, one or more electrically conductive flaps extend from an edge of the substantially planar structure. This may allow the flaps to be made from bent metal folded over the edge.

According to a second aspect there is provided a printed circuit board (PCB) including the dual polarity antenna as described above. A more compact structure with a reduced number of parts may be achieved by providing the dual polarity antenna on a PCB.

BRIEF DESCRIPTION OF THE DRAWINGS

The present invention will now be described by way of example with reference to the accompanying drawings. In the drawings.

DETAILED DESCRIPTION

The apparatus described in the present disclosure includes dual polarity antennas.

Embodiments of the present disclosure tackle one or more of the problems previously mentioned by locating and/or embedding the second radiator in the first radiator. This enables the size of the columns to be reduced, which enables the antenna column array to be densified, which increases the system throughput and improves the spectral efficiency.

The present disclosure provides a dual polarity radiator with a narrow width and standard height and length that allows the construction of ultra-dense arrays. The dual polarity radiator may produce dual-linear, e.g. horizontal and vertical, radiation. Although an exemplary implementation of the present disclosure may be described in the sub-1 GHz band, the features of the present disclosure may be equally applicable to improve the performance in higher frequency bands where the width and bandwidth constraints are less critical.

Figure 1A:
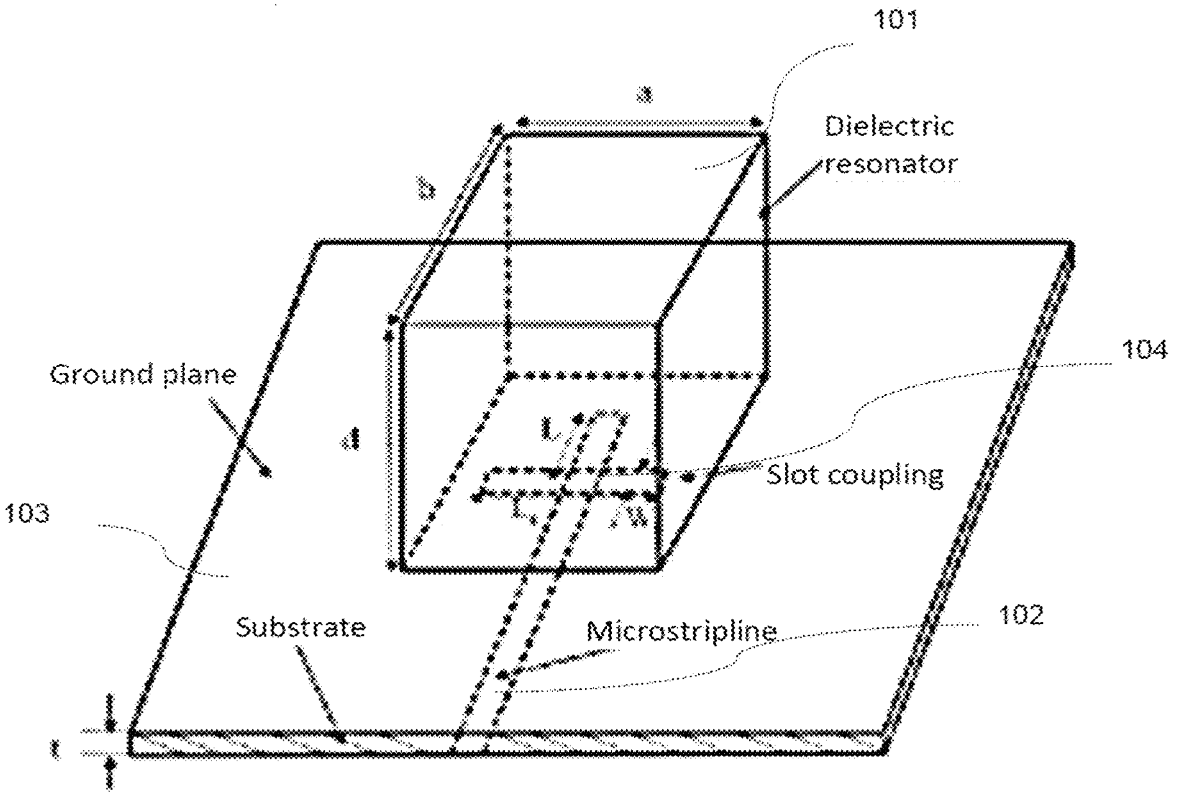
Figure 1A Prior Art
FIG. 1A schematically illustrates an example antenna of the prior art and FIG. 1B schematically illustrates another example antenna of the prior art.
Figure 1B:
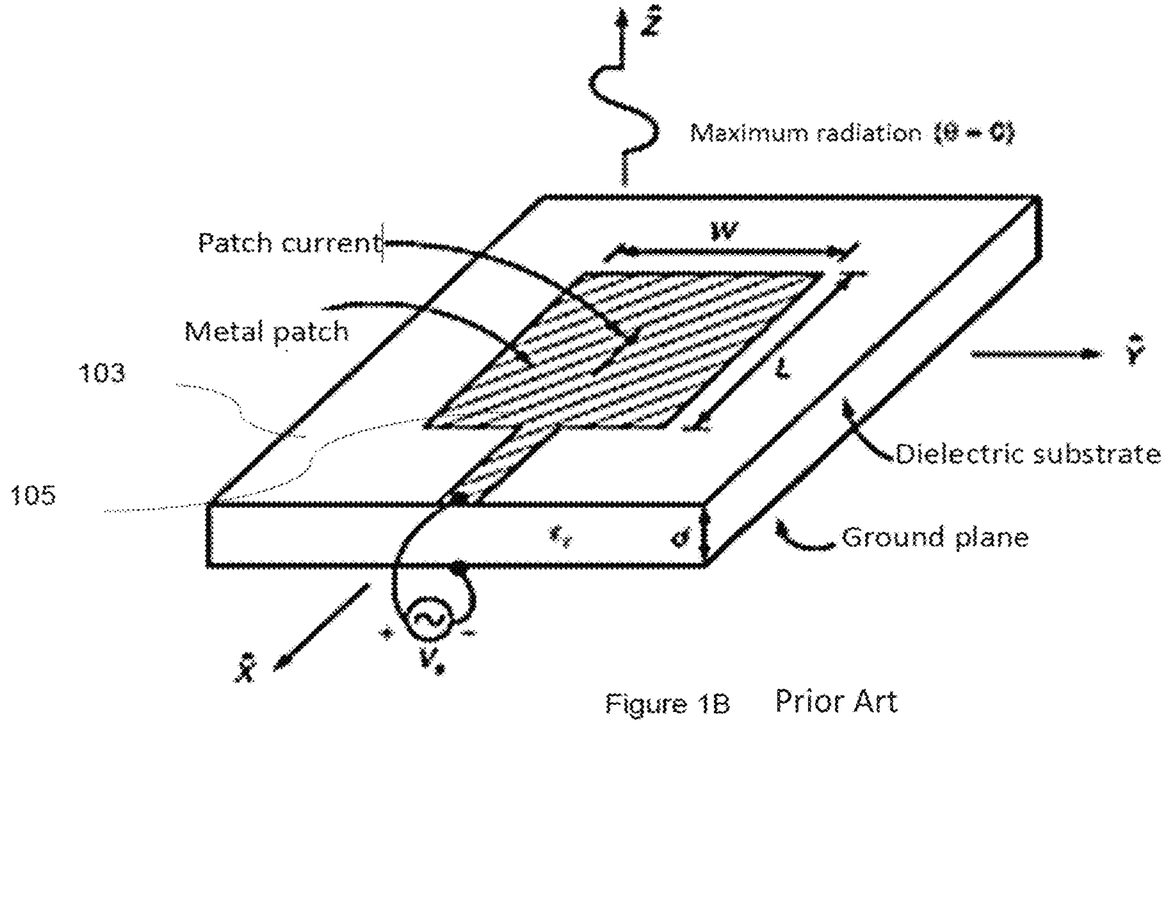
Figure 1B Prior Art
Figure 2:
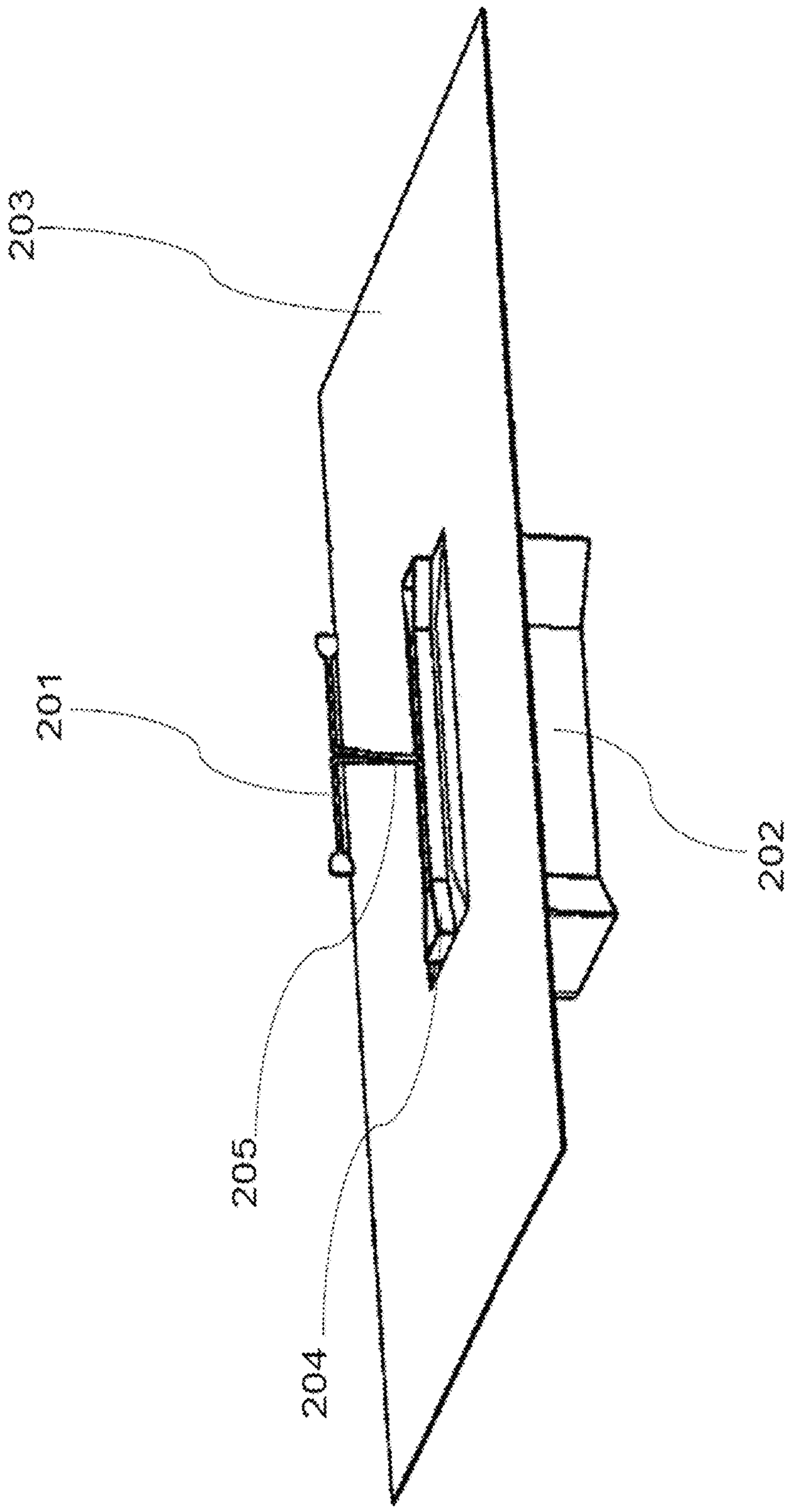
Figure 2 Prior Art
FIG. 2 schematically illustrates an example dual polarity antenna of the prior art.
Figure 3:
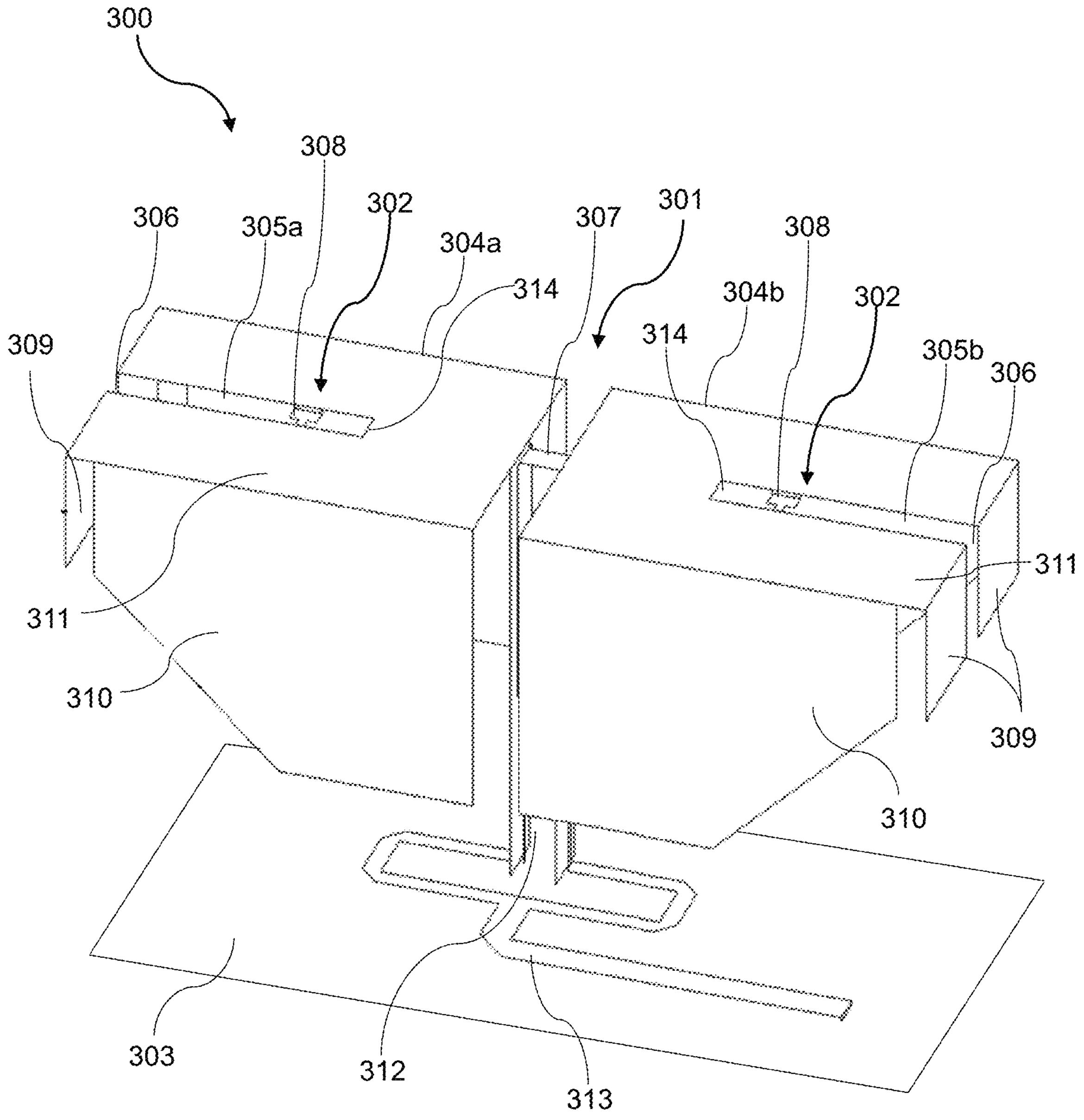
FIG. 3 schematically illustrates an exemplary dual polarity antenna.

FIG. 3 schematically illustrates an exemplary dual polarity antenna.

The dual polarity antenna 300 may include a first radiator 301. The first radiator 301 may include a dipole radiator. The first radiator 301 may be a dipole antenna. The first radiator 301 may radiate or receive a first RF wave having a first linear polarisation. This may provide a first radiating structure from the first radiator 301. The first RF wave may be a plane wave propagating in one direction. The first RF wave may be a component of the dipole wave radiated by the first radiator 301. The dipole wave may be seen as a superposition of plane waves. At a point sufficiently far away from the first radiator 301, the dipole wave may be approximately a single plane wave.

As illustrated in FIG. 3, the first radiator 301 may include a substantially planar structure. In other words, the first radiator 301 may be generally flat and/or may include a structure that is thin with respect to the width and length. The first radiator 301 may include a region or section which is flat. The major surface of the first radiator 301 may be defined by the largest flat surface. As shown in the orientation of FIG. 3, the major surface of the first radiator 301 is provided by the top surface.

The first radiator 301 may include one or more electrically conductive parts 304. The first radiator 301 may include two or more dipole arms 304. The one or more electrically conductive parts 304 may be dipole arms 304. In an exemplary implementation, the first radiator 301 includes two dipole arms 304. The first radiator 301 may include a first dipole arm 304 and a second dipole arm 304*b*. This provides the advantage that the first radiator 301 may provide the required dipole radiation. To provide the required radiation, the first radiator 301 may require two dipole arms 304. If, for example, the first radiator 301 included four dipole arms 304 then the apparatus may provide two dual polarity antennas 300. In other words, two dipole arms 304 may be required to provide a dual polarity antenna 300.

The one or more electrically conductive parts 304 of the first radiator 301 may include one or more electrically conductive parts 304 arranged in a substantially planar structure. The dipole arms 304 may include a substantially planar structure. In other words, the dipole arms 304 may be generally flat and/or may include a structure that is thin with respect to the width and length. The dipole arms 304 may include a region or section which is flat. As shown in the orientation of FIG. 3, the major surface of the dipole arms 304 is provided by the top surface.

As shown in FIG. 3, the dipole arms 304 may include a rectangular shape. It will be appreciated that other shapes may be suitable for the dipole arms 304. For example, the dipole arms 304 may include a square or trapezoidal shape. A rectangular shape for the dipole arms 304 may be utilized as it may enable the dipole arms 304 to be more compact. This may be beneficial if the dual polarity antenna 300 needs to be fit into a small volume, or a dense array.

The first radiator 301 may further include a first feeding point 307. The first feeding point 307 may be configured to provide excitation to the first radiator 301. In other words, the first feeding point 307 may provide the signal to the first radiator 301. The first feeding point 307 may provide vertical polarisation. This may provide a first radiating structure from the first radiator 301.

The first feeding point 307 may be located between the dipole arms 304. As shown in FIG. 3, the first radiator 301 may include a gap between the dipole arms 304. The first feeding point 307 may be located in the gap between the dipole arms. In this way, the polarisation may be provided to both the dipole arms 304 which are located on either side of the first feeding point 307. The gap may extend at least part of the width of the dipole arms 304. The gap may extend the full width of the dipole arms 304, as shown in FIG. 3.

The dual polarity antenna 300 may include a first feeding network 312 for exciting the first radiator 301 with the first RF signal. The first feeding point 307 may be coupled to the first feeding network 312. The first feeding point 307 may be powered by the first feeding network 312. The first feeding network 312 may extend from below the first radiator 301 and up between the dipole arms 304 to the first feeding point 307. The first feeding network 312 may extend from below the first radiator 301 and up between the dipole arms 304 through the gap.

The first radiator 301 may further include one or more flaps 309, 310. The flaps 309, 310 may extend from the first radiator 301. The flaps 309, 310 may extend in a direction substantially normal to the major surface of the first radiator 301. In other words, as shown in the orientation in FIG. 3, the flaps 309, 310 may extend down from the major surface of the first radiator 301. The flaps 309, 310 may extend down from the major surface of the first radiator 301 at 90 degrees to the major surface of the first radiator 301. It will also be appreciated that the flaps may extend up from the major surface of the first radiator 301. The flaps 309, 310 may extend from an edge of the first radiator 301. The flaps 309, 310 may be located on the dipole arms 304 of the first radiator 301.

The flaps 309, 310 may include vertical flaps 309 and horizontal flaps 310. As shown in FIG. 3, the vertical flaps 309 may extend from the edge of a dipole arm 304 that is opposite the edge where the first feeding point 307 is. As shown in FIG. 3, the horizontal flaps 310 may extend from the edge of a dipole arm 304 that is adjacent to the edge where the first feeding point 307 is. The horizontal flaps 310 may extend from both of the edges that are adjacent to the edge where the first feeding point 307 is.

An exemplary implementation may include no vertical flaps, only the one or more vertical flaps 308, and/or only the one or more horizontal flaps 310. FIG. 3 shows two vertical flaps 309 on each dipole arm 304, located on the two adjacent edges to the first feeding point 307. FIG. 3 shows two horizontal flaps 310 on each dipole arm 304, both located, side by side, on the opposite edge to the first feeding point 307. The number of flaps 309, 310 may be varied depending on the design requirements for the first radiator 301.

The flaps 309, 310 may include a rectangular shape. The flaps 309, 310 may include a trapezoidal shape. The flaps 309, 310 may include a shape that is suitable for providing a dense array of first radiators 301. For example, the flaps 309, 310 may be configured to have a shape which is suitable for fitting the first radiators 301 into the array in a compact or dense way.

The flaps 309, 310 may be electrically conductive. The flaps 309, 310 may increase the surface area of the dipole arms 304 of the first radiator 301. This may increase the dipole electrical length of the dipole arms 301. This may cause the dipole arms 304 to resonate at a lower frequency while keeping a small footprint. This may provide the advantage that the level of radiation may be increased for a given footprint of the first radiator 301. In some situations, the horizontal flaps 310 may be more effective at providing increased radiation than the vertical flaps 309.

The dual polarity antenna 301 may include a second radiator 302. The second radiator 302 may include a dipole radiator. The second radiator 302 may be a dipole antenna. The second radiator 302 may radiate or receive a second RF wave having a second linear polarisation. This may provide a second radiating structure from the second radiator 301. The second RF wave may be a plane wave propagating in one direction. The second RF wave may be a component of the dipole wave radiated by the second radiator 302. The dipole wave may be seen as a superposition of plane waves. At a point sufficiently far away from the second radiator 302, the dipole wave may be approximately a single plane wave. The first RF wave and the second RF wave may have the same frequency. This may provide a logical configuration for providing the dual polarity antenna by configuring the first RF wave and the second RF wave. In this way, the antenna may not produce a multiband or multifrequency radiator.

The second linear polarisation may be different to the first linear polarisation. In some implementations, the first linear polarisation may be orthogonal to the second linear polarisation. In this way, the dual polarity antenna 300 may produce polarisation in horizontal and vertical directions. The dual polarity antenna 301 may include one or more second radiators 302.

The second radiator 302 may be located in the first radiator 301. In other words, the first radiator 301 may provide the second radiator 302. The second radiator 302 may be located and/or embedded in the structure of the first radiator 301. The second radiator 302 may be part of the first radiator 301. In this way, the dual polarisation antenna 300 structure may be more compact as the first radiator 301 and the second radiator 302 may be provided in the same component, and/or structure. Additionally, both the horizontal and vertical polarisations may be provided by the same body. This may reduce the number of parts, cost, complexity and size of the dual polarisation antenna 300.

The second radiator 302 may be provided in the one or more electrically conductive parts 304. In an exemplary implementation, the second radiator 302 may be located in the dipole arms 304. In other words, the dipole arms 304 may provide the second radiator 302. The second radiator 302 may be located in the structure of the dipole arms 304. The second radiator 302 may be part of the dipole arms 304. There may be two or more second radiators 302. A second radiator 302, of the two or more second radiators 302, may be located in each of the dipole arms 304. Each second radiator 302, of the two or more second radiators may be located in a different dipole arm 304. As shown in FIG. 3, each of the two dipole arms 304 includes a second radiator 302. The number of second radiators 302 may correspond to the number of dipole arms 304.

The second radiator 302 may include an opening 305 in the first radiator 301. In particular, the second radiator 302 may include an opening 305 in a dipole arm 304. As shown in FIG. 3, each of the two dipole arms 304 may include an opening 305. Each second radiator 302, of the two or more second radiators 302, may include an opening 305 in a different dipole arm 301.

The opening 305 may include a slot 305. The second radiator 302 may include a slot 305 in the first radiator 301. In particular, the second radiator 302 may include a slot 305 in a dipole arm 304. The second radiator 302 may be provided by one or more slots 305 in the one or more electrically conductive parts 304.

As shown in FIG. 3, each of the two dipole arms 304 may include a slot 305. Each second radiator 302, of the two or more second radiators 302, may include a slot 305 in a different dipole arm 301. The second radiator 302 may be provided by one or more slots in the one or more electrically conductive parts 304. The one or more slots 305 include a first slot 305*a* formed in the first dipole arm 304*a* and a second slot 305*b* formed in the second dipole arm 304*b*. The first slot 305*a* and the second slot 305*b* extend along a common axis of the first dipole arm 304*a* and the second dipole arm 304*b*.

The slot 305 may include an open end 306 and a closed end 314. The slot 305 may extend from an edge of the first radiator 301. In an exemplary implementation, the slot 305 may extend from an edge of the dipole arm 304. The open end 306 of the slot 305 may be positioned at the edge of the first radiator 301. In an exemplary implementation, the open end 306 of the slot 305 may be positioned at the edge of the dipole arm 304. The open end 306 of the slot 305 may be positioned at the edge of the dipole arm 304 which is opposite the edge where the first feeding point 307 is. The first slot 305*a* may have an open end 306 at an outer end of the first dipole arm 304*a*. The second slot 305*b* may have an open end at an outer end of the second dipole arm 304*b*.

The slot 305 may extend from the edge of the dipole arm 304 towards the first feeding point 307. The slot 305 may extend from an edge of the dipole arm 304 partly through the dipole arm 304 in a direction substantially towards the first feeding point 307. In other words, the slot 305 may extend generally in the direction of the feeding point 307, relative to the open end 306 at the edge of the dipole arm 304.

The slot 305 may not extend all the way through the dipole arm 304. The first slot 305*a* may have a closed end 314 near an inner end of the first dipole arm 304*a*. The second slot 305*b* may have a closed end 314 near an inner end of the second dipole arm 304*b*. There may be a section, or region, of the dipole arm 304 which is located between the closed end 314 of the slot 305 and the first feeding point 307. In this way there may not be interference between the first radiator 301 and the second radiators 302. The section, or region, of the dipole arm 304 which is located between the closed end 314 of the slot 305 and the first feeding point 307 is preferably large enough to stop, or limit, interference between the first radiator 301 and the second radiators 302.

The slot 305 may include a linear shape. The slot 305 may include a rectangular shape. Preferably, the slot 305 may include an elongate shape that extends from the edge of the dipole arm 304 in a direction predominantly towards the opposite edge of the dipole arm 304 to the open end 306. The slot 305 may be surrounded on the elongate sides by the major surface of the dipole arm 304. The slot 305 may be surrounded at the closed end 314 by the major surface of the dipole arm 304. The slot 305 may be surrounded on three sides by the major surface of dipole arm 304.

In an exemplary implementation, the slot 305 extends all the way through the thickness dipole arm 304. In other words, as shown in FIG. 3, the slot 305 may include a cut out in the major surface of the dipole arm 304.

The vertical flaps 309 which extend from the opposite edge of the dipole arms 304 to the first feeding point 307 may be arranged such that they do not cover the open end 306 of the slot 305. The vertical flaps 309 may be arranged on either side of the open end 306 of the slot 305. In this way, the vertical flaps 309 may not interfere with the second radiator 302.

The second radiator 302 may include a second feeding point 308. Each second radiator 302 of the one or more second radiators 302 may include a second feeding point 308. The second feeding point 308 may be configured to provide excitation to the corresponding second radiator 302. In other words, second feeding point 308 may provide the signal to corresponding second radiator 302. In this way, both the horizontal and vertical polarisations may be provided by the same body. Each second radiator 302 may include an independent second feeding point 308. The second feeding point 308 may provide horizontal polarisation. Preferably, each of the one or more second radiators 302 provides the horizontal polarisation in phase. In other words, the polarisation may be provided with a zero-degree lag. This may provide a second radiating structure from the two second radiators 302.

The second feeding point 308 may be located in the opening 305 of the second radiator 305. As shown in FIG. 3, the second feeding point may be positioned closer to the closed end 314 of the slot 305 than the open end 306 of the slot 305. In implementations in which the slot 305 extends through the thickness of the dipole arm 304, the second feeding point 308 may extend from below the first radiator 304 and into the slot 305. The second feeding point 308 may positioned in the same general plane as the dipole arm 304. The second feeding point 308 may be surrounded by the inner sides of the slot 305.

The dual polarity antenna may include a second feeding network 313 for exciting the second radiator 302 with a second RF signal. The second feeding point 308 may be coupled to the second feeding network 313. The second feeding point 308 may be powered by the second feeding network 313. The second feeding network 313 may extend from below the first radiator 301. The second feeding network 313 may extend up between the dipole arms 304. The second feeding network 313 may extends outwards under the dipole arms 304 to the second feeding point 308. The second feeding network 313 may feed both of the second feeding points 308. The second feeding network 313 may be configured to excite the two or more slots 305 in phase. In this way, each of the one or more second radiators 302 may provide the horizontal polarisation in phase. In other words, the polarisation may be provided with a zero-degree lag. This may provide a second radiating structure from the two second radiators 302.

The second feeding network 313 may be configured to excite each respective slot 305 of the one or more slots at a central region of the respective slot 305. This may be carried out by providing the second feeding points 308 near the centre of the slot 305.

The second feeding network 313 may extend from below the first radiator 301. The second feeding network 313 may split in between the dipole arms 304. The second feeding network 313 may extend outwards under each of the dipole arms 304 to each of the second feeding points 308. The first feeding network 312 and the second feeding network 312 may extend from below the first radiator 301 next to one another and split near the base of the first radiator 301.

The dual polarity antenna 300 may further include a reflector 303. In the orientation shown in FIG. 3, the reflector 303 may be positioned below the first radiator 301. The reflector 303 may be configured to reflect the polarisation from the first radiator 301 and the second radiator 302.

The reflector may be positioned such that the first radiator 301 and the second radiator 302 are arranged on one side of the reflector 303. The reflector may be positioned such that the first radiator 301 and the second radiator 302 are arranged on the same side of the reflector 303. In the orientation shown in FIG. 3, the first radiator 301 and the second radiator 302 are positioned on the top side of the reflector 303. In this way, there may be no part of the first radiator 301 and the second radiator 302 positioned below the reflector 303. This may provide a more compact structure for the dual polarity antenna 300. This may also provide a substantially flat surface on the base of the reflector 303 which may simplify the integration of active devices.

The first feeding network 312 and/or the second feeding network 312 may be positioned on the reflector 303. The first feeding network 312 and/or the second feeding network 312 may extend upwards from the reflector 303. The first feeding network 312 and/or the second feeding network 312 may be positioned above the reflector 303.

The reflector 303 may be substantially parallel to the substantially planar structure of the first radiator 301. The reflector 303 may be positioned to be substantially parallel to the major surface of the first radiator 301. The reflector 303 may be positioned to be substantially parallel to the major surface of one or more of the dipole arms 304. In this way, the reflector 303 may reflect the radiation from the first radiator 301 and the one or more further first radiators 302 in the required direction, i.e. upwards.

The first radiator 301, including the dipole arms 304, may be manufactured using metal sheet to create the radiating structure. The tabs 309, 310 may be manufactured by bending the metal sheets of the dipole arms 304. The feeding input lines 312, 313 for vertical and horizontal polarisation may also be manufactured using bended sheet metal. Plastic clips and spacers may be also required for mechanical robustness and to ensure the position of the feeding input lines 312, 313 and the distance to ground.

Figure 4A:
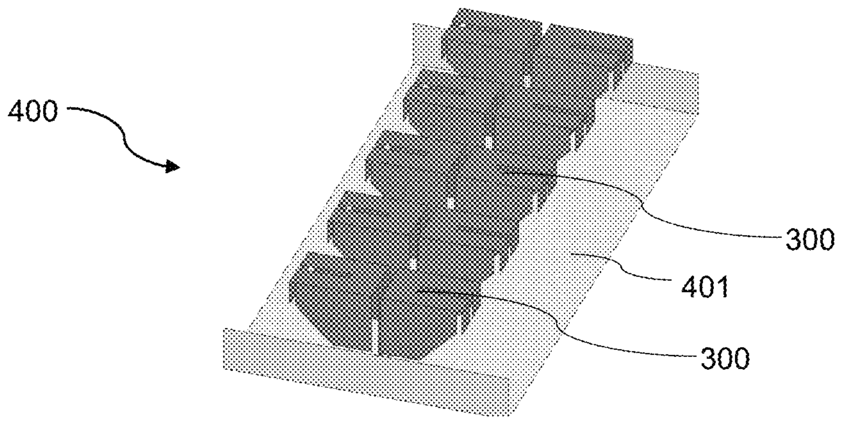
FIG. 4A schematically illustrates five exemplary dual polarity antennas arranged on a base plate, FIG. 4B schematically illustrates seven exemplary dual polarity antennas arranged on a base plate, and FIG. 4C schematically illustrates nine exemplary dual polarity antennas arranged on a base plate.
Figure 4B:
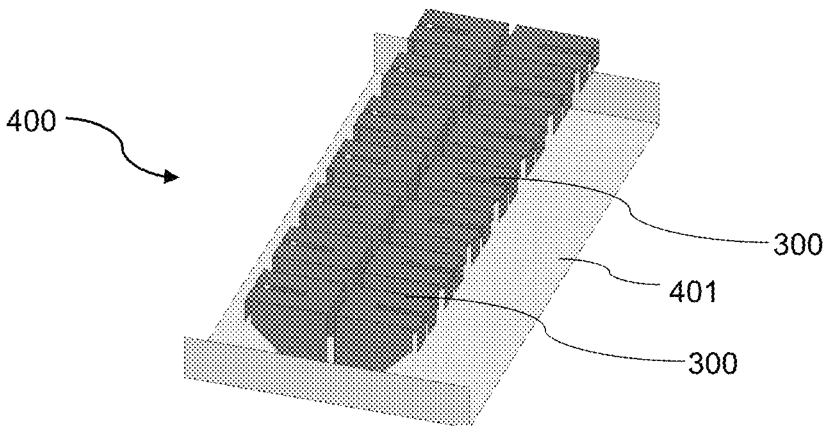
Figure 4C:
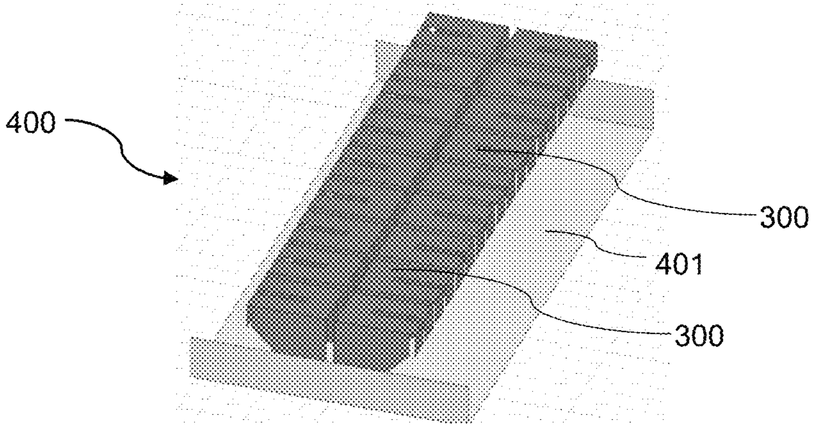

FIG. 4A schematically illustrates 5 exemplary dual polarity antennas arranged on a base plate. FIG. 4B schematically illustrates 7 exemplary dual polarity antennas arranged on a base plate. FIG. 4C schematically illustrates 9 exemplary dual polarity antennas arranged on a base plate.

As shown in FIGS. 4A to 4C, a plurality of dual polarity antennas 300 may be arranged in an array 400. The array 400 may include a single base plate 401 located under the plurality of dual polarity antennas 300. In some implementations, the array 400 may include a base plate 401 for each dual polarity antenna 300. The base plate 401 may provide the reflector 301. In some implementations, the reflector 303 and the base plate 401 may be sperate components. There may be a single reflector 303 for all of the dual polarity antennas 300. In some implementations, there may be a reflector 303 for each dual polarity antenna 300. The array 400 of dual polarity antennas 300 may be arranged such that the dual polarity antennas 300 are positioned side by side. There may be a small gap between each of the dual polarity antennas 300.

In an exemplary embodiment, the dual polarity antennas 300 may include a size of 50×150×80 mm, which is equivalent to 0.12λ×0.35λ×0.18λ. The array 400 may include a maximum width of 500 m. With a width of 50 mm, compared to an average width of 120 mm in the prior art, this may provide a 50 to 60% reduction in width. This means that up to 9 dual polarity antennas 300 may be arranged compared to a maximum of 4 dual polarity antennas 300 in the prior art.

As shown in FIGS. 4A to 4C, the number of dual polarity antennas 300 may be varied from 5 to 7 to 9, depending on the design requirements.

Printed circuit board (PCB) technology may also be used to produce the dual polarity antenna 300. The dual polarity antenna 300 may be provided on a PCB. The PCB implementation may include any of the features described herein with regards to the metal sheet implementation in FIG. 3.

Figure 5A:
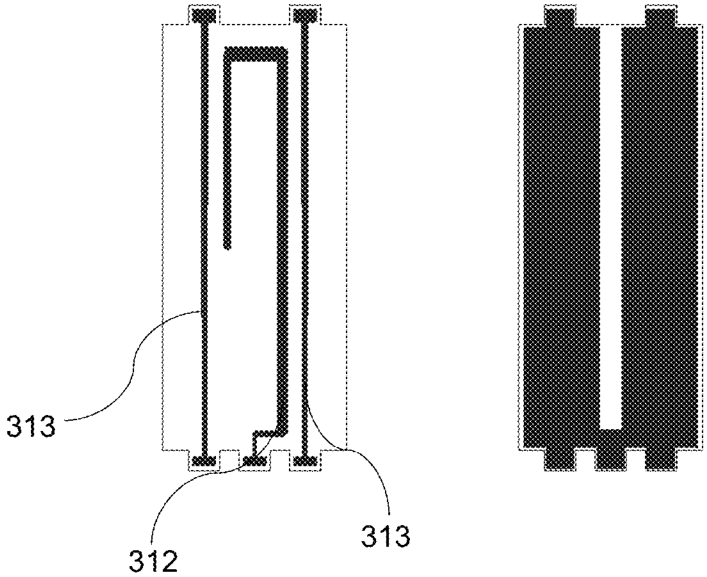
FIG. 5A schematically illustrates an exemplary feeding structure implemented on a printed circuit board and FIG. 5B schematically illustrates an exemplary radiating element implemented on a printed circuit board.
Figure 5B:
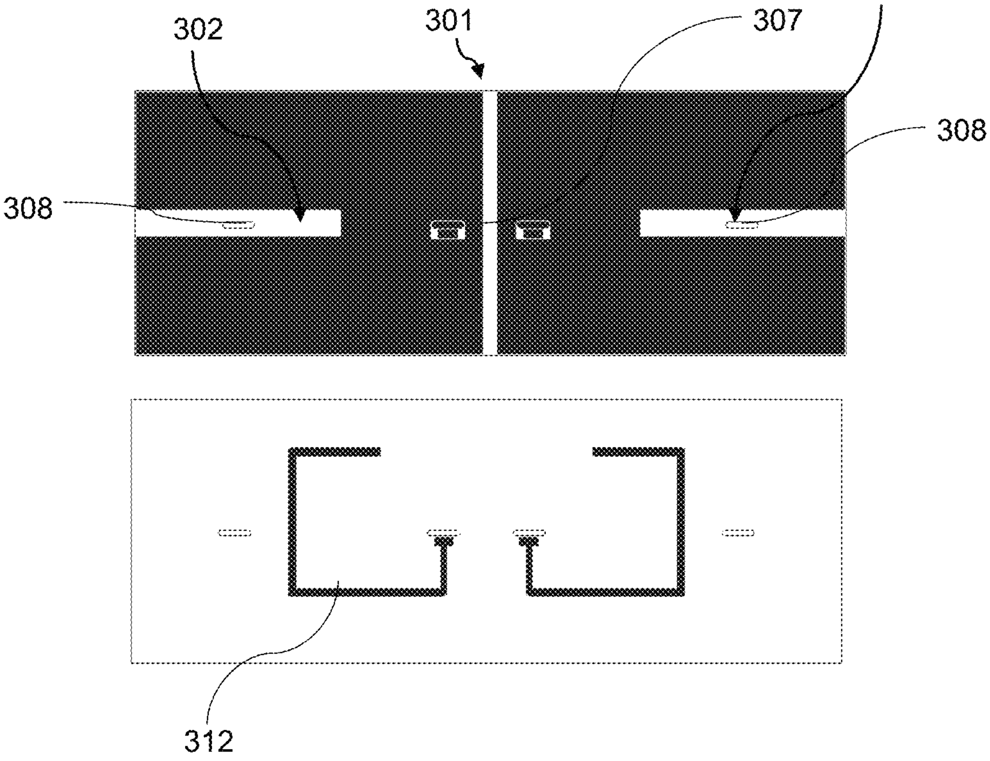

FIG. 5A schematically illustrates an exemplary feeding structure implemented on a PCB. FIG. 5B schematically illustrates an exemplary radiating element implemented on a PCB.

The feeding input lines 312, 313 for both the vertical and horizontal polarisation respectively may be etched in the same PCB carrier, as shown in FIG. 5A. The first radiator 301 itself may be etched in another PCB carrier, as shown in FIG. 5B. Several soldering points may be required to interconnect the PCB containing the feeding input lines 312, 313 (FIG. 5A) with the first radiator 301 itself (FIG. 5B). Additionally, flaps 309, 310 may optionally be soldered to the edges of the PCB to provide the same characteristics as described herein with regard to the metal sheet implementation illustrated in FIG. 3.

Additionally, metallized plastic techniques may also be a suitable choice to implement the dual polarity antenna 300. In this case, several first radiators 301 and the feeding network 312, 313 may be arranged in the same metallized plastic part.

The choice of the manufacturing technique may depend on many aspects, such as frequency band, array configuration, cost target, or accuracy requirements.

The dual polarity antenna 300 may be designed such that there is no, or minimal, interference between the first radiator 301 and the second radiators 302. To understand the working principle, and how it may be possible to excite two orthogonal polarisations in the same component, the current distribution may be plotted. In FIGS. 6A, 6B, 7A, and 7B the current distribution is plotted for the vertical and horizontal polarisation, both for a single polarisation and for a dual polarisation case.

Figure 6A:
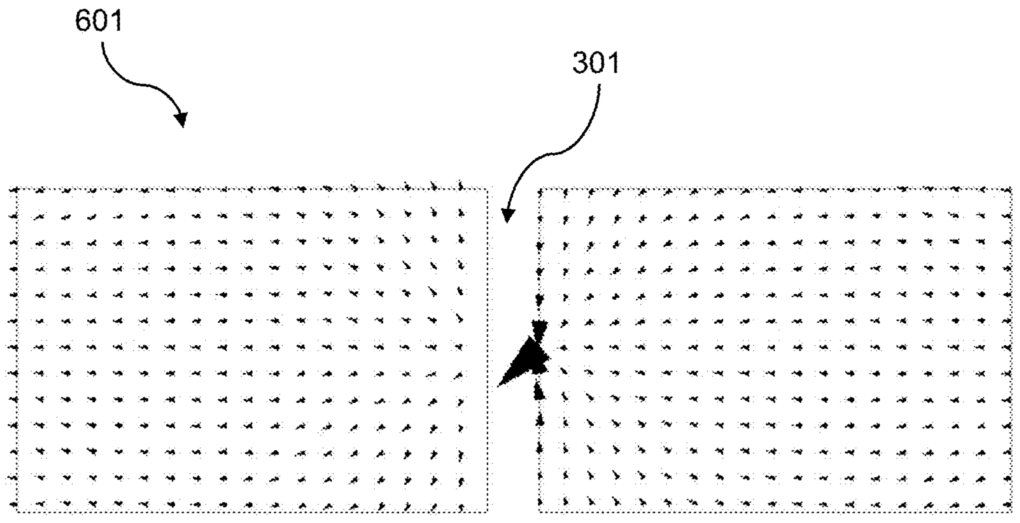
FIG. 6A schematically illustrates the vertical polarisation current distribution in a single polarisation situation and FIG. 6B schematically illustrates the vertical polarisation current distribution in a dual polarisation situation.
Figure 6B:
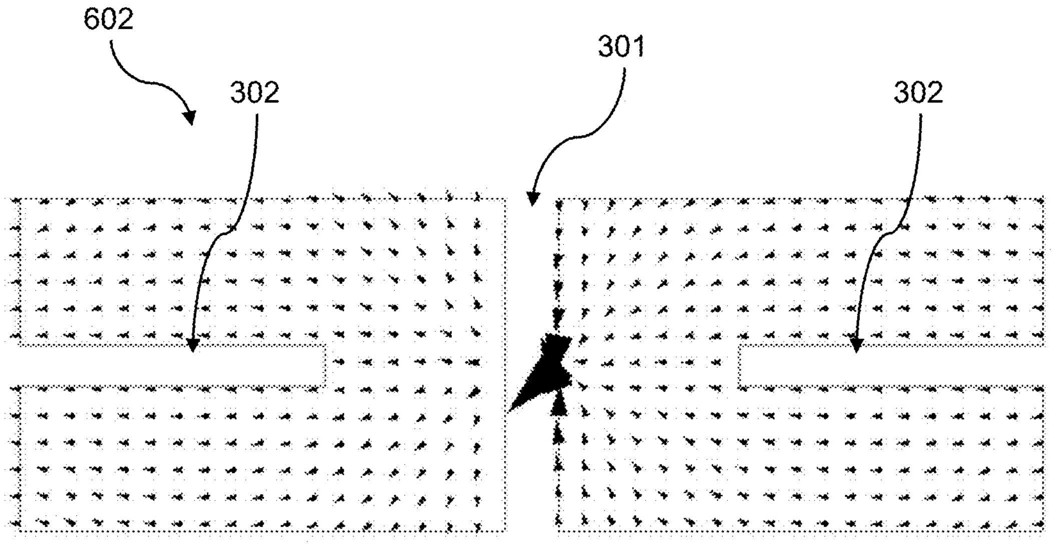

FIG. 6A schematically illustrates the vertical polarisation current distribution in a single polarisation situation. FIG. 6B schematically illustrates the vertical polarisation current distribution in a dual polarisation situation.

The plot 601 in FIG. 6A shows the vertical polarisation current distribution when there is a single polarisation situation. As can be seen, the vertical polarisation current distribution is influenced around the first radiator 301. The plot 602 in FIG. 6B shows the vertical polarisation current distribution in a dual polarisation situation. As can be seen, the vertical polarisation current distribution is still influenced around the first radiator 301. However, the first radiator 301 does not influence the vertical polarisation current distribution around the second radiators 302. In this way, there may be no interference from the first radiator 301 on the second radiators 302.

Figure 7A:
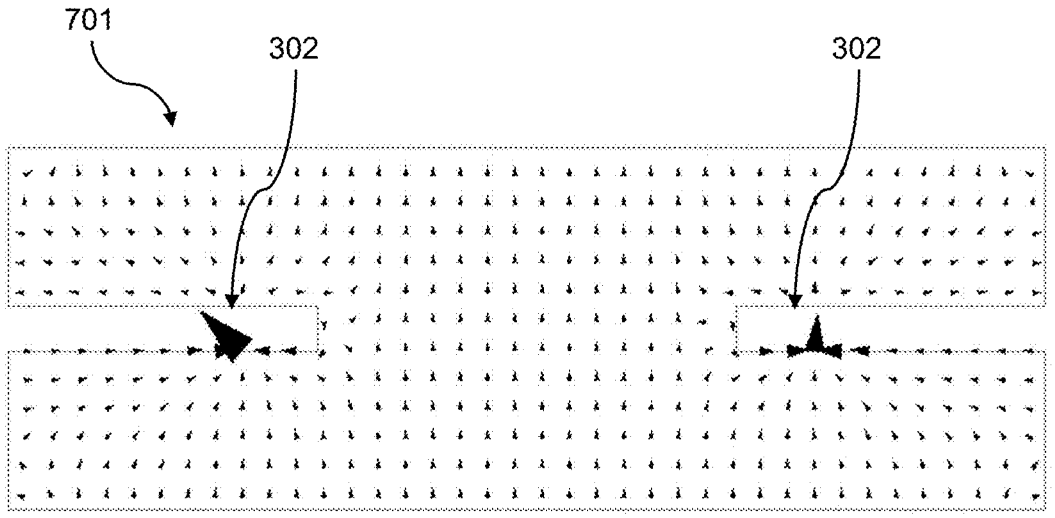
FIG. 7A schematically illustrates the horizontal polarisation current distribution in a single polarisation situation and FIG. 7B schematically illustrates the horizontal polarisation current distribution in a dual polarisation situation.
Figure 7B:
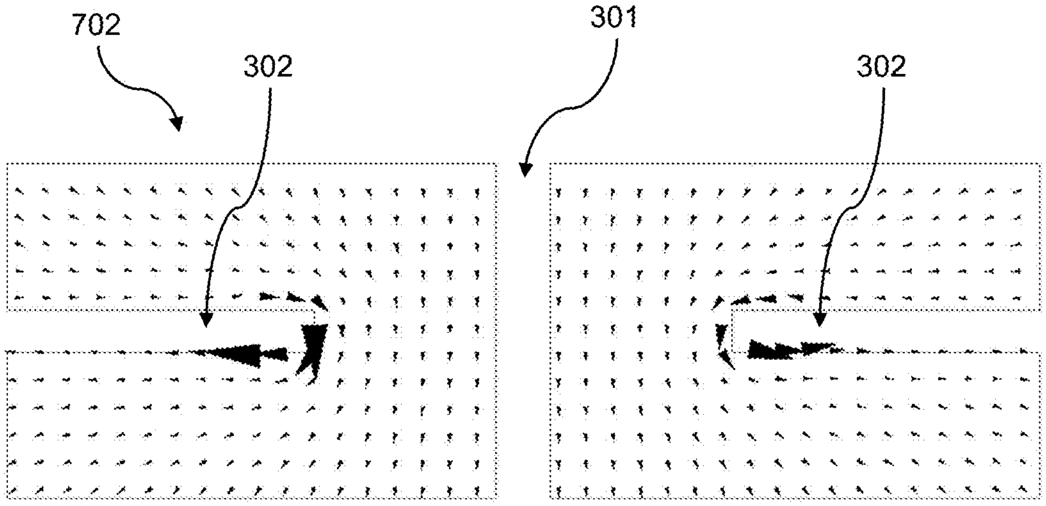

FIG. 7A schematically illustrates the horizontal polarisation current distribution in a single polarisation situation. FIG. 7B schematically illustrates the horizontal polarisation current distribution in a dual polarisation situation.

The plot 701 in FIG. 7A shows the horizontal polarisation current distribution when there is a single polarisation situation. As can be seen, the horizontal polarisation current distribution is influenced around the second radiators 302. The plot 702 in FIG. 7B shows the horizontal polarisation current distribution in a dual polarisation situation. As can be seen, the horizontal polarisation current distribution is still influenced around the second radiators 302. However, the second radiators 302 do not influence the horizontal polarisation current distribution around the first radiator 301. In this way, there may be no interference from the second radiators 302 on the first radiators 301.

Based on the plots, it can be seen that the two polarisations may work independently. Comparing the current plots of the same polarisation, with and without the slots required to excite the orthogonal polarisation, it can be observed that there are low currents in the areas where the orthogonal polarisation is excited. The current plots for a single and dual polarity case are also similar. In this way, the presence of the second polarisation may have little impact because the system excites it in areas where the currents are very low. That is the reason why the two polarisations may coexist with good levels of isolation.

The present disclosure provides the following benefits: (i) the radiator, that is dual polarity, may have a width of ~0.4× the dipoles used in base station antennas of the prior art, (ii) the substantial width reduction may allow the arrangement of multiple columns, with less than 0.3 lambda spacing, in a limited aperture, and (iii) the radiating structure may overcome the limitations of the prior art and may be produced at low cost using standard manufacturing techniques such as bended metal sheet, PCB or partially metallized plastic.

The present disclosure discloses in isolation each individual feature described herein and any combination of two or more such features, to the extent that such features or combinations are capable of being carried out based on the present disclosure as a whole in the light of the common general knowledge of a person skilled in the art, irrespective of whether such features or combinations of features solve any problems disclosed herein, and without limitation to the scope of the claims. The present disclosure indicates that aspects described herein may consist of any such individual feature or combination of features. In view of the foregoing description, it will be evident to a person skilled in the art that various modifications may be made within the scope of the present disclosure.

What is claimed is:

1. A dual polarity antenna, the dual polarity antenna comprising:
- a first radiator for radiating or for receiving a first radio-frequency (RF) wave having a first linear polarisation;
- a second radiator for radiating or for receiving a second RF wave having a second linear polarisation orthogonal to the first linear polarisation;
- a first feeding network for exciting the first radiator with a first RF signal; and
- a second feeding network for exciting the second radiator with a second RF signal,
- wherein the first radiator comprises one or more electrically conductive parts and the second radiator is provided by one or more slots in the one or more electrically conductive parts, and
- wherein the second feeding network is configured to excite each respective slot of the one or more slots at a central region of the respective slot.

2. The dual polarity antenna of claim 1, wherein the first RF wave and the second RF wave have a same frequency.

3. The dual polarity antenna of claim 1, wherein each of the one or more slots has a closed end and an open end.

4. The dual polarity antenna of claim 1, wherein the first radiator is a dipole antenna, the dipole antenna comprising a first dipole arm and a second dipole arm.

5. The dual polarity antenna of claim 4, wherein the one or more slots comprise a first slot formed in the first dipole arm and a second slot formed in the second dipole arm.

6. The dual polarity antenna of claim 5, wherein the first slot and the second slot extend along a common axis of the first dipole arm and the second dipole arm.

7. The dual polarity antenna of claim 5, wherein the first slot has an open end at an outer end of the first dipole arm, and the second slot has an open end at an outer end of the second dipole arm.

8. The dual polarity antenna of claim 5, wherein the first slot has a closed end near an inner end of the first dipole arm, and the second slot has a closed end near an inner end of the second dipole arm.

9. The dual polarity antenna of claim 1, wherein the one or more slots are two or more slots, and wherein the second feeding network is further configured to excite the two or more slots in phase.

10. The dual polarity antenna of claim 1, wherein the first radiator comprises two dipole arms and a first feeding point located between the two dipole arms, the first feeding network being coupled to the first radiator at the first feeding point.

11. The dual polarity antenna of claim 1, further comprising a reflector, the first radiator and the second radiator being arranged on one side of the reflector.

12. The dual polarity antenna of claim 1, wherein the one or more electrically conductive parts of the first radiator are arranged in a substantially planar structure.

13. The dual polarity antenna of claim 12, further comprising a reflector that is substantially parallel to the substantially planar structure.

14. The dual polarity antenna of claim 12, wherein the first radiator further comprises one or more electrically conductive flaps extending in a direction substantially normal to the substantially planar structure.

15. The dual polarity antenna of claim 14, wherein one or more electrically conductive flaps extend from an edge of the substantially planar structure.

16. The dual polarity antenna of claim 12, wherein the first radiator further comprises two dipole arms, a first feeding point located between the two dipole arms, one or more vertical flaps, and one or more horizontal flaps.

17. The dual polarity antenna of claim 16, wherein the one or more vertical flaps are located on two adjacent edges to the first feeding point, and wherein the one or more horizontal flaps are located side by side on an opposite edge to the first feeding point.

18. A printed circuit board, the printed circuit board comprising:

a dual polarity antenna, the dual polarity antenna comprising:

a first radiator for radiating or for receiving a first radio-frequency (RF) wave having a first linear polarisation;

a second radiator for radiating or for receiving a second RF wave having a second linear polarisation orthogonal to the first linear polarisation;

a first feeding network for exciting the first radiator with a first RF signal; and a second feeding network for exciting the second radiator with a second RF signal, wherein the first radiator comprises one or more electrically conductive parts and the second radiator is provided by one or more slots in the one or more electrically conductive parts, and wherein the second feeding network is configured to excite each respective slot of the one or more slots at a central region of the respective slot.

* * * * *